Patented May 14, 1940

2,200,299

UNITED STATES PATENT OFFICE 2,200,299

FATTY ALCOHOL DERIVATIVE

Edwin A. Robinson, Chatham, N. J., assignor to
National Oil Products Company, Harrison, N. J.,
a corporation of New Jersey No Drawing. Application April 13, 1939,
Serial No. 267,723

23 Claims. (Cl. 260—458)

This invention relates to derivatives of unsaturated fatty alcohols and inorganic acids, more particularly to blown fatty alcohol sulfates and phosphates.

It is known that unsaturated fatty alcohols having at least 8 carbon atoms may be reacted with inorganic acids such as sulfuric acid or phosphoric acid to produce products having valuable properties; thus, for example; the unsaturated fatty alcohol sulfates and phosphates are valuable wetting and dispersing agents. However, such reaction products tend to become rancid and discolored upon exposure to oxidizing influences such as atmospheric air. This tendency makes it disadvantageous to employ these products under conditions such that they are subjected to oxidizing influences; particularly it has been found that these products when exposed for prolonged periods of time to air become quite rancid and discolored and hence unfit for most commercial uses. Since there is a large and readily available supply of unsaturated fatty alcohols having at least 8 carbon atoms, it would be economically desirable to utilize these alcohols to greater advantage than is at present possible.

It is the object of this invention to provide derivatives of unsaturated fatty alcohols and inorganic acids which are relatively permanently stable to oxidizing influences. A more specific object of this invention is to prepare valuable wetting, dispersing and emulsifying agents from unsaturated fatty alcohols having at least 8 carbon atoms which may be exposed to the presence of air without becoming rancid or discolored.

In accordance with my invention, valuable derivatives of unsaturated fatty alcohols containing at least 8 carbon atoms, which have substantially no tendency to discolor or become rancid and which are relatively permanently stable to oxidizing influences, are produced by reacting an inorganic acid compound with a blown fatty alcohol composition comprising a blown unsaturated fatty alcohol having at least 8 carbon atoms. The blown fatty alcohol composition employed in the practice of my invention may be prepared by blowing a composition comprising an unsaturated fatty alcohol having at least 8 carbon atoms; preferably the fatty alcohol composition is prepared by blowing a composition comprising an unsaturated fatty alcohol having an iodine value above about 70 as described in my copending application Serial No. 267,722, filed April 13, 1939. The preferred embodiments of my invention involve the production of esters of oxygen containing inorganic acids, particularly sulfates or phosphates of the blown fatty alcohol compositions; I have found that the sulfates and phosphates produced in the practice of my invention have wetting, dispersing and emulsifying properties comparable to those of the sulfates and phosphates of the corresponding unblown alcohols, but do not have the undesirable properties of becoming rancid and discolored when subjected to oxidizing influences.

The blown fatty alcohol compositions used in the practice of my invention may be prepared by contacting an unsaturated fatty alcohol having at least 8 carbon atoms with air, oxygen, ozone, or mixtures thereof; thus, for example, alcohols such as oleyl alcohol, ricinoleyl alcohol, linoleyl alcohol, alcohols prepared from oxidized petroleum fractions, wax alcohols and alcohols prepared by the reduction of fatty oils or fatty acids, such as soybean oil, teaseed oil, oiticia oil, castor oil, olive oil, rice bran oil, fish fatty acids, etc., are among the alcohols which may be treated. Mixtures of unsaturated fatty alcohols having at least 8 carbon atoms and saturated alcohols such as stearyl alcohol may also be treated to produce blown fatty alcohol compositions for use in accordance with my invention. The term "unsaturated fatty alcohol composition" used in the specification and claims is intended to include not only relatively pure unsaturated fatty alcohols having at least 8 carbon atoms, but also mixtures of these unsaturated fatty alcohols including those containing appreciable amounts of saturated fatty alcohols; the term "blown fatty alcohol composition" is intended to cover products obtained by blowing an unsaturated fatty alcohol composition and mixtures of such blown products with constituents such as substantially saturated fatty alcohols which do not detrimentally affect the character of the products of this invention. The unsaturated fatty alcohol composition may be blown in any desired manner; for example, air, oxygen, ozone, or a mixture thereof may be blown through a fluid mass or a solution of the unsaturated fatty alcohol composition, or the composition may be sprayed through a body of any of the above oxidizing agents. The blowing treatment may be carried out in the presence of catalysts such as, for example, metallic driers, peroxides and the like. The unsaturated fatty alcohol composition may advantageously be mixed prior to blowing with a relatively small amount of water, e. g. about 10%, to increase the hydroxyl content of the blown product. The time of blowing may vary widely depending upon the characteristics desired in the final product, but ordinarily between about 3 and 36 hours are suitable. The blowing may be conducted at any desirable temperatures; preferably temperatures between about 75° C. and 200° C. are employed.

The blown fatty alcohol composition is preferably prepared by blowing an unsaturated fatty alcohol composition having an iodine value above about 70 as described in my copending application hereinabove mentioned. The blown product thus obtained has an iodine value substantially lower than that of the unblown composition, which value may vary between about 25 and about 150, preferably between about 40 and about 80; the acetyl value of the blown product is greater than that of the corresponding unblown alcohol composition by an amount which may vary between about 2 and about 75, preferably between about 4 and about 35. Such a product possesses a very high surface activity and hence may be advantageously reacted with inorganic acid compounds, particularly acids such as sulfuric acid and phosphoric acid, to form reaction products having highly valuable properties. It is to be understood, however, that my invention is not limited to the treatment of such blown alcohol compositions.

The blown fatty alcohol composition produced as described above may then, in accordance with this invention, be reacted with an inorganic acid compound to form an ester. The acid compound with which the blow composition is reacted may be any of the inorganic acid compounds capable of forming valuable esters. Thus, for example, if it is desired to produce a sulfate of the blown fatty alcohol composition, the composition may be reacted with a compound such as sulfuric acid, pyrosulfuric acid, oleum, sulfur trioxide or chlorsulfonic acid. A phosphate may be produced by reaction with ortho, meta, hypo or pyrophosphoric acids, thiophosphoric acids in which one or more of the oxygen atoms are replaced with sulfur, ethyl metaphosphate, phosphorus oxychloride, phosphorus pentoxide, phosphorus pentasulphide and phosphorus pentachloride; phosphorus trichloride and phosphorus trisulphide may be employed to produce a phosphite and a thiophosphite, respectively. If it is desired to prepare a borate, the blown fatty alcohol composition may be reacted with boric acid or other suitable boron compounds; reaction with silicon tetrachloride or similar silicon compounds yields a silicate. Other inorganic acid compounds may also be employed to react with the blown fatty alcohol composition to produce valuable reaction products.

The conditions of the reaction of the blown fatty alcohol composition with the inorganic acid compound may vary depending somewhat upon the particular reactants employed and the type of product desired. The reactants may be mixed directly or the reaction may be carried out in any suitable solvent, such as, for example, dioxane, ethylether, dichlorethylether, acetone, ethylenedichloride, solvent naphtha or the like. The presence of a dehydrating agent such as acetic anhydride or acetyl chloride accelerates the reaction. In general it may be said the reaction may be carried out in accordance with any of the methods for esterifying alcohols with inorganic acids known to the art.

The relative proportions of the reactants depend to a great extent upon the type of product desired. If a neutral ester is to be produced, a sufficient amount of blown fatty alcohol composition should be used to neutralize substantially all of the acidic constituents of the acid compound. Thus, for example, in preparing a neutral phosphate by reacting a blown fatty alcohol composition with phosphorus oxychloride, approximately 3 molecular parts of the composition should be reacted with about 1 molecular part of phosphorus oxychloride; neutral sulfates are most advantageously prepared by reacting the blown fatty alcohol composition with sulfuryl chloride, although other suitable methods may be employed. The neutral esters have been found to be relatively insoluble in water and are especially useful as plasticizers and softening agents for pyroxylin, glues and the like.

On the other hand, if it is desired to prepare acid esters, the relative proportions of blown fatty alcohol composition to inorganic acid compound should be suitably controlled to effect this result by reacting with the inorganic acid compound an amount of blown fatty alcohol composition insufficient to neutralize the acidic constituents of the acid compound. Thus, for example, if it is desired to prepare an acid sulfate by reacting a blown fatty alcohol composition with sulfuric acid substantially less than 2 molecular parts of the composition should be reacted with about 1 molecular part of sulfuric acid. The acid esters may also be obtained by hydrolyzing neutral esters produced as above described with an acid such as hydrochloric acid or an alkali such as caustic soda.

The acid esters may be neutralized with alkali or alkaline earth compounds such as sodium, potassium or calcium hydroxide, or with compounds of other metals, such as magnesium, aluminum, copper, cobalt, nickel, iron, zinc and silver. The acid ester may if desired be neutralized with caustic soda or ammonia and then reacted with a water-soluble metallic salt, such as zinc chloride, aluminum acetate or copper nitrate. The alkali salts of the acid esters are generally readily soluble in water, whereas the alkaline earth and heavy metal salts are somewhat less soluble. Nitrogenous bases, such as ammonia, methylamine, monoethanolamine, tri-isopropanolamine, triethanolamine, morpholine, pyridine, diethylene triamine, glucamine and the like may also be used to neutralize the acid esters; these salts of the acid esters and nitrogenous bases are extremely soluble in water.

When operating in accordance with one of the preferred embodiments of my invention, namely, when preparing acid sulfates of blown fatty alcohol compositions, I have found it particularly desirable to carefully control the conditions of sulfation, for by so doing a product having highly effective wetting and dispersing properties may be obtained. In accordance therewith a blown fatty alcohol composition may be most advantageously sulfated by reaction with strong sulfuric acid, e. g. 98% $H_2SO_4$, preferably containing appreciable amounts of free $SO_3$; the preferred sulfating agent employed contains about 12% free $SO_3$ and may be formed by mixing about 60 parts of 20% oleum with about 40 parts of 98% sulfuric acid. The blown fatty alcohol composition is preferably added to the sulfating agent, approximately equal amounts of the reactants being employed. The temperature of the reaction should be relatively low, e. g. between about 15° and about 40° C., preferably between about 15° and about 20° C. The mixture may be reacted for between about 1½ and about 2 hours. I have found that a blown fatty alcohol composition treated as above described yields a sulfated product having an $SO_3$ content substantially higher than the $SO_3$ content of the sulfated product obtained by treating the corresponding unblown fatty alcohol composition in the same manner; thus it is evident that it is possible to employ a smaller amount of sulfating agent to produce a fatty alcohol sulfate of a definite $SO_3$ content when working with the blown fatty alcohol compositions employed in the practice of my invention than when sulfating the corresponding unblown fatty alcohol compositions under the same conditions, so that a more economical use of sulfating agent is attained by my invention. The acid sulfate produced as above described may be treated as desired. Preferably it is neutralized with a 50% caustic soda solution at a maximum temperature of about 20° C., whereby a product having excellent wetting, dispersing and emulsifying properties is obtained. In carrying out both the sulfation and neutralization, it is desirable to continuously agitate the reaction mixture by means of a device which also serves to scrape the walls of the vessels.

The following examples are illustrative of the process of my invention. Amounts are given in parts by weight.

Example I 100 parts of blown sperm oil alcohols having an iodine value of 58 and an acetyl value of 226, produced from a mixture of sperm oil alcohols having an iodine value of 78.3 and an acetyl value of 192 by blowing air therethrough for 12 hours at 140° C., distilling and recovering the distillate, were introduced into a vessel containing 100 parts of a mixture consisting of 60 parts of 20% oleum and 40 parts of 98% sulfuric acid. The mixture was agitated at a temperature between about 15° and about 20° C. for about 2 hours by means of a stirring device which also served to scrape the walls of the vessel. At the end of this time the sulfation mass was neutralized with a 50% caustic soda solution, the temperature being maintained below 20° C. with cracked ice. The neutralized mass was permitted to stand for 12 hours, the water layer separated and the desired product withdrawn. The $SO_3$ content of the finished product was 14.5%. It was readily soluble in water and possessed excellent wetting and dispersing properties.

The above product was then further purified by dissolving the mass in 1000 parts of isopropyl alcohol, whereupon the inorganic salts precipitated out. The alcohol was then distilled off carrying with it water present in the mass, whereby a substantially anhydrous product free of inorganic salts was obtained.

Example II 100 parts of blown oleyl alcohol having an iodine value of 76.1 and an acetyl value of 181, produced from oleyl alcohol having an iodine value of 87.6 and an acetyl value of 177 by blowing air therethrough for 12 hours at 140° C., were introduced into a vessel containing 100 parts of a mixture consisting of 60 parts of 20% oleum and 40 parts of 98% sulfuric acid. The mixture was agitated at a temperature between about 15° and about 20° C. for about 2 hours by means of a device which also served to scrape the walls of the vessel. At the end of this time the sulfation mass was neutralized with a 50% caustic soda solution, the temperature being maintained below 20° C. with cracked ice. The neutralized mass was permitted to stand for 12 hours, the water layer separated and the desired product withdrawn. The product was readily soluble in water and possessed excellent wetting and dispersing properties.

Example III 100 parts of blown sperm oil alcohols obtained as described in Example I were introduced into a vessel containing 100 parts of a mixture consisting of 75 parts of 98% sulfuric acid and 25 parts of 20% oleum. The mixture was agitated at a temperature of 20° C. for about 2 hours by means of a device which also served to scrape the vessel. At the end of this time the sulfation mass was neutralized with a 50% caustic soda solution, the temperature being maintained below 20° C. with cracked ice. The neutralized mass was permitted to stand for 12 hours, the water layer separated and the desired product withdrawn. The $SO_3$ content of the finished product was 13.6%. It was readily soluble in water and possessed excellent wetting and dispersing properties.

Example IV 100 parts of blown sperm oil alcohols obtained as described in Example I were introduced into a vessel containing 100 parts of a mixture consisting of 60 parts of 20% oleum and 40 parts of 98% sulfuric acid. The mixture was agitated at a temperature between about 30° and about 35° C. for about 2 hours by means of a device which also served to scrape the walls of the vessel. At the end of this time the sulfation mass was neutralized with a 50% caustic soda solution, the temperature being maintained below 20° C. with cracked ice. The neutralized mass was permitted to stand for 12 hours, the water layer separated and the desired product withdrawn. The finished product had an $SO_3$ content of 11.7%. It was readily soluble in water and possessed good wetting and dispersing properties.

Example V 300 parts of blown sperm oil alcohols prepared by blowing sperm alcohols having an iodine value of 70.1 and an acetyl value of 138 for 44 hours at 100° C. were dissolved in 288 parts of dry ether. 71 parts of phosphorus pentoxide were then gradually added to the solution over a period of 2½ hours with constant agitation. Since the heat of the reaction vaporized most of the ether, 144 additional parts of ether were added, and the mixture was then permitted to stand for 20 hours. The solvent was then evaporated and the product neutralized with morpholine to yield an amber, viscous oil which dissolved readily in water, was stable to hydrochloric acid and possessed excellent foaming action.

Example VI 300 parts of blown sperm oil alcohols were reacted with 71 parts of phosphorus pentoxide as described in Example V. The product was neutralized with potassium hydroxide, yielding a clear, amber, viscous oil readily dispersible in water.

Example VII 300 parts of blown sperm oil alcohols were reacted with 71 parts of phosphorus pentoxide as described in Example V. The product was neutralized with triethanolamine yielding a clear, amber, viscous oil readily soluble in water.

Example VIII 10 parts of ethyl metaphosphate were added to 25 parts of blown oleyl alcohol obtained as described in Example II, and the mixture heated to about 70° C. for 1 hour. The reaction mixture was then neutralized with 14 parts of triethanolamine to a pH value of about 6.5. The product was a clear, amber, viscous liquid readily soluble in water.

Example IX 15 parts of pyrophosphoric acid and 0.5 part of concentrated sulfuric acid were added to 25 parts of blown linoleyl alcohol and permitted to react for 2 hours at 120° C. The reaction mixture was then neutralized with isopropanolamine. The product thus formed was readily soluble in water and possessed good foaming action. Unreacted fatty alcohols were removed by treating a water solution of the reaction product with ethylene dichloride.

Example X 16 parts of metaphosphoric acid were mixed with 50 parts of blown sperm oil alcohols obtained as described in Example I and permitted to react at a temperature between about 40° and 50° C. for 20 hours. 20 parts of methanol were then added and the mixture washed with 100 parts of 15% sodium chloride solution; the methanol prevented the formation of objectionable emulsions and was removed by the sodium chloride solution. The washed reaction product was then neutralized with 45 parts of triethanolamine. The product thus obtained gave a brilliantly clear solution in water and was an excellent emulsifier for fats, oils, waxes, etc.

Example XI 100 parts of blown sperm oil alcohols obtained as described in Example I were dissolved in 200 parts of ethylene dichloride and 100 parts of sulfuryl chloride were added to the solution. The solution was then maintained at a temperature of about 45° C. for 6 hours, during which time hydrogen chloride gas was evolved from the solution. At the end of this time the solution was washed with a dilute sodium carbonate solution to remove unreacted sulfuryl chloride and the ethylene dichloride distilled off. A substantially neutral, amber oil was thereby obtained.

The products of my invention may be employed as dispersing, emulsifying, defoaming, plasticizing, binding or wetting agents for adhesives; as emulsifying agents in antiseptics, disinfectants and germicides; as plasticizing agents for cement; as blending, emulsifying, skin cleansing and skin softening agents for cosmetics; as detergents; as antioxidants; as defoaming agents during fermentation and as dispensing agents for vitamins, medicines, milk products and vegetable oils in foods; as anti-knock agents, pour point depressors and sludge dispersers in fuels; as dispersing, plasticizing and thickening agents in inks; as emulsifying and dispensing agents in insecticides, sprays, preservatives, mold and mildew preventives; in fat liquoring, finishing, softening, coating and tanning of leather; as extreme pressure lubricant and cutting oil ingredients; as additions to greases; as pour point depressants and as wire drawing compounds; as flotation agents or aids in the flotation of ores; as degreasing and anti-corrosive agents in the treating of metals; as emulsifying and plasticizing agents for paints, varnishes and coating compositions; as defoaming, de-inking, dispersing and sizing agents in paper making; as drilling oils and de-emulsifiers in crude petroleum industry; as plasticizers for glue, resins, sizes and the like; as softeners and blending agents for plasticizers; as dye dispersers and emulsifying agents in automobile, floor and shoe polishes; as dewaxing agents and pour point depressants in petroleum refining; as bitumen emulsifiers and dust laying agents in road treatment; as dispersers, emulsifiers and latex stabilizers in rubber; as de-electrifying, delustering, desizing, desulphurizing, Sanforizing, scouring, soaking, degumming, softening, wetting and wool washing agents in textile treatment and as wetting and emulsifying agents in the softening of hulls on beans, corn kernels and the like. I have also found that the phosphates of the blown fatty alcohol compositions are useful as shampoos.

The terms "sulfate" and "phosphate" are used in the specification and claims to denote both the unneutralized esters obtained by reacting the blown fatty alcohol compositions with a sulfating agent or a phosphating agent respectively, and the products obtained by neutralizing these esters.

Since certain changes may be made in the above products and different embodiments of the invention could be made without departing from the scope thereof, it is intended that all matter contained in the above description shall be interpreted as illustrative and not in a limiting sense. Having described my invention, what I claim as new and desire to secure by Letters Patent, is:

1. The reaction product of a compound selected from the group consisting of inorganic oxygen-containing acids and derivatives thereof capable of forming esters and a blown fatty alcohol composition.

2. The reaction product of a compound selected from the group consisting of inorganic oxygen-containing acids and derivatives thereof capable of forming esters and a blown fatty alcohol composition having an iodine value between about 25 and about 150, and an acetyl value greater than that of the corresponding unsaturated fatty alcohol composition by an amount between about 2 and about 75.

3. The reaction product of a compound selected from the group consisting of inorganic oxygen-containing acids and derivatives thereof capable of forming esters and a blown fatty alcohol composition comprising an alcohol containing at least 8 carbon atoms.

4. The reaction product of a compound selected from the group consisting of inorganic oxygen-containing acids and derivatives thereof capable of forming esters and a blown fatty alcohol composition having an iodine value between about 40 and about 80, and an acetyl value greater than that of the corresponding unsaturated fatty alcohol composition by an amount between about 4 and about 35, and comprising an alcohol containing at least 8 carbon atoms.

5. The reaction product of a compound selected from the group consisting of inorganic oxygen-containing acids and derivatives thereof capable of forming esters and a blown fatty alcohol containing at least 8 carbon atoms and having an iodine value between about 40 and about 80, and an acetyl value greater than that of the corresponding unsaturated fatty alcohol by an amount between about 4 and about 35, said blown fatty alcohol being obtainable by blowing an unsaturated fatty alcohol containing at least 8 carbon atoms and having an iodine value above about 70.

6. The reaction product of a compound selected from the group consisting of inorganic oxygen-containing acids and derivatives thereof capable of forming esters and a blown fatty alcohol composition having an iodine value between about 40 and about 80, an acetyl value greater than that of the corresponding unsaturated fatty alcohol composition by an amount between about 4 and about 35, and comprising an alcohol containing at least 8 carbon atoms and an appreciable amount of a substantially saturated fatty alcohol, said blown fatty alcohol composition being obtainable by blowing an unsaturated fatty alcohol composition having an iodine value above about 70 and containing an unsaturated alcohol having at least 8 carbon atoms and appreciable amounts of a substantially saturated fatty alcohol.

7. As a new chemical product an ester selected from the group consisting of sulfates and phosphates of blown fatty alcohol compositions.

8. The reaction product of a compound selected from the group consisting of inorganic oxygen-containing acids and derivatives thereof capable of forming esters and blown oleyl alcohol having an iodine value between about 40 and about 80, and an acetyl value greater than that of the oleyl alcohol by an amount between about 4 and about 35.

9. The reaction product of a compound selected from the group consisting of inorganic oxygen-containing acids and derivatives thereof capable of forming esters and blown sperm oil alcohols having an iodine value between about 40 and about 80, and an acetyl value greater than that of the sperm oil alcohols by an amount between about 4 and about 35.

10. The reaction product of a compound selected from the group consisting of inorganic oxygen-containing acids and derivatives thereof capable of forming esters and blown ricinoleyl alcohol having an iodine value between about 40 and about 80, and an acetyl value greater than that of the recinoleyl alcohol by an amount between about 4 and about 35.

11. As a new chemical product an ester selected from the group consisting of sulfates and phosphates of blown oleyl alcohol having an iodine value between about 40 and about 80, and an acetyl value greater than that of the oleyl alcohol by an amount between about 4 and about 35.

12. As a new chemical product an ester selected from the group consisting of sulfates and phosphates of blown sperm oil alcohols having an iodine value between about 40 and about 80, and an acetyl value greater than that of the sperm oil alcohols by an amount between about 4 and about 35.

13. As a new chemical product an ester selected from the group consisting of sulfates and phosphates of blown ricinoleyl alcohol having an iodine value between about 40 and about 80, and an acetyl value greater than that of the ricinoleyl alcohol by an amount between about 4 and about 35.

14. A process for preparing derivatives of unsaturated fatty alcohol compositions, which derivatives are relatively permanently stable to oxidizing influences, comprising reacting a blown fatty alcohol composition with a compound selected from the group consisting of inorganic oxygen-containing acids and derivatives thereof capable of forming esters.

15. A process for preparing derivatives of unsaturated fatty alcohol compositions, which derivatives are relatively permanently stable to oxidizing influences, comprising reacting a compound selected from the group consisting of inorganic oxygen-containing acids and derivatives thereof capable of forming esters with a blown fatty alcohol composition having an iodine value between about 25 and 150, and an acetyl value greater than that of the corresponding unsaturated fatty alcohol composition by an amount between about 2 and about 75, and containing an alcohol having at least 8 carbon atoms.

16. A process for preparing derivatives of unsaturated fatty alcohol compositions, which derivatives are relatively permanently stable to oxidizing influences, comprising reacting a compound selected from the group consisting of inorganic oxygen-containing acids and derivatives thereof capable of forming esters with a blown fatty alcohol composition having an iodine value between about 40 and about 80, and an acetyl value greater than that of the corresponding unsaturated fatty alcohol composition by an amount between about 4 and about 35, and containing an alcohol having at least 8 carbon atoms, said blown fatty alcohol composition being obtainable by blowing an unsaturated fatty alcohol composition having an iodine value above about 70.

17. A process for preparing derivatives of unsaturated fatty alcohol compositions, which derivatives are relatively permanently stable to oxidizing influences, comprising reacting an inorganic oxygen containing acid with a blown fatty alcohol composition having an iodine value between about 40 and about 80, and an acetyl value greater than that of the corresponding unsaturated fatty alcohol composition by an amount between about 4 and about 35, and containing an alcohol having at least 8 carbon atoms, said blown fatty alcohol composition being obtainable by blowing an unsaturated fatty alcohol composition having an iodine value above about 70.

18. A process for preparing sulfates of blown fatty alcohol compositions which comprises adding a blown fatty alcohol composition to an approximately equal amount of strong sulfuric acid containing not substantially more than 12% free sulfur trioxide, reacting the mixture at temperatures between about 15° and about 40° C. for about 1½ hours to about 2 hours, and neutralizing the reaction mass with sodium hydroxide at a temperature not exceeding about 20° C.

19. As new chemical products water-soluble salts of sulfuric acid esters of blown fatty alcohol compositions.

20. As new chemical products water-soluble salts of phosphoric acid esters of blown fatty alcohol compositions.

21. As a new chemical product a water-soluble salt of an ester selected from the group consisting of sulfates and phosphates of blown oleyl alcohol having an iodine value between about 40 and about 80, and an acetyl value greater than that of the oleyl alcohol by an amount between about 4 and about 35.

22. As a new chemical product a water-soluble salt of an ester selected from the group consisting of sulfates and phosphates of blown sperm oil alcohols having an iodine value between about 40 and about 80, and an acetyl value greater than that of the sperm oil alcohols by an amount between about 4 and about 35.

23. As a new chemical product a water-soluble salt of an ester selected from the group consisting of sulfates and phosphates of blown ricinoleyl alcohol having an iodine value between about 40 and about 80, and an acetyl value greater than that of the ricinoleyl alcohol by an amount between about 4 and about 35.

EDWIN A. ROBINSON.